(12) United States Patent
Wilson et al.

(10) Patent No.: US 7,500,135 B2
(45) Date of Patent: Mar. 3, 2009

(54) FAULT TOLERANT DATA STORAGE DEVICE

(75) Inventors: Chris Wilson, Sunnyvale, CA (US);
Viresh Rustagi, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 601 days.

(21) Appl. No.: 11/096,167

(22) Filed: Mar. 30, 2005

(65) Prior Publication Data
US 2005/0246572 A1  Nov. 3, 2005

Related U.S. Application Data

(60) Provisional application No. 60/562,852, filed on Apr. 15, 2004, provisional application No. 60/648,488, filed on Jan. 31, 2005.

(51) Int. Cl.
*G06F 11/00* (2006.01)
(52) U.S. Cl. .................. 714/6; 714/7; 711/173
(58) Field of Classification Search ............... 714/6, 714/7; 711/162, 173; 707/202, 204
See application file for complete search history.

(56) References Cited

U.S. PATENT DOCUMENTS

| | | | |
|---|---|---|---|
| 5,367,682 A * | 11/1994 | Chang | 713/1 |
| 5,680,540 A * | 10/1997 | Pearce | 714/24 |
| 5,742,818 A | 4/1998 | Shoroff et al. | |
| 6,173,376 B1 * | 1/2001 | Fowler et al. | 711/162 |
| 6,438,639 B1 * | 8/2002 | Bakke et al. | 710/302 |
| 6,578,034 B1 * | 6/2003 | Rafanello | 707/10 |
| 6,675,176 B1 * | 1/2004 | Shinkai et al. | 707/200 |
| 6,675,242 B2 * | 1/2004 | Benson et al. | 710/104 |
| 6,721,880 B1 | 4/2004 | Pike | |
| 6,963,951 B2 * | 11/2005 | Ng et al. | 711/112 |
| 7,191,286 B2 | 3/2007 | Forrer, Jr. et al. | |
| 7,299,314 B2 * | 11/2007 | Lin et al. | 711/103 |
| 2002/0087653 A1 | 7/2002 | Duroj | |
| 2003/0023811 A1 | 1/2003 | Kim et al. | |
| 2005/0081004 A1 * | 4/2005 | Zhang | 711/162 |

FOREIGN PATENT DOCUMENTS

EP    0986014 A2    3/2000

OTHER PUBLICATIONS

"Media vault disk layout." retrieved Jan. 18, 2008 from http://www.k0lee.com/hpmediavault/diskformat/index.html.*

(Continued)

*Primary Examiner*—Robert Beausoliel
*Assistant Examiner*—Philip Guyton
(74) *Attorney, Agent, or Firm*—McAndrews, Held & Malloy, Ltd.

(57) ABSTRACT

Aspects of the invention incorporate a method and a system of providing fault tolerant data recovery in one or more data storage drives of a data storage device. The method of implementing fault tolerance in a data storage device may comprise storing information related to one or more data pools into one or more pool information blocks of one or more partitions of one or more data storage drives of the data storage device. The system of implementing fault tolerance when implementing one or more data pools using one or more data storage drives may comprise a memory, a software resident in the memory, and a processor capable of executing the software.

16 Claims, 5 Drawing Sheets

OTHER PUBLICATIONS

"Partition Table Definition." The Linux Information Project. retrieved from "http://www.linfo.org/partition_table.html" on Jul. 7, 2008.*

IBM Corporation, "Object-Oriented Interface Design; IBM Common User Access Guidelines", Dec. 1992, 4 pages, Que Corporation, Carmel, Indiana.

* cited by examiner

FAULT TOLERANT DATA STORAGE DEVICE

RELATED APPLICATIONS/INCORPORATION BY REFERENCE

This application makes reference to and claims priority from U.S. Provisional Patent Application Ser. No. 60/562,852, entitled "FAULT TOLERANT DATA STORAGE IN A DISK STORAGE DEVICE" filed on Apr. 15, 2004, the complete subject matter of which is incorporated herein by reference in its entirety.

This application makes reference to and claims priority from U.S. Provisional Patent Application Ser. No. 60/648,488, entitled "FAULT TOLERANT DATA STORAGE DEVICE" filed on Jan. 31, 2005, the complete subject matter of which is incorporated herein by reference in its entirety.

This application makes reference to U.S. application Ser. No. 11/087,136, filed Mar. 22, 2005, the complete subject matter of which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When any portion of a data storage device is updated, any interruptions occurring during the update procedure may have severe consequences, especially if an update procedure is performed on metadata. The metadata may be updated by way of an update procedure performed on the data storage device. Unfortunately, in some instances, such an update procedure may be interrupted and the data stored into the data storage device may comprise corrupt data. An interruption may be caused by electrical or physical occurrences while performing the update procedure. For example, a power failure may corrupt data being written into one or more data storage drives of the data storage device during the update procedure. Further, one or more data storage drives that are physically removed from the data storage device may interrupt the update procedure to result in one or more errors to the metadata. When such metadata errors occur, the ability to access to stored data that relies on the use of such metadata, may be negatively affected.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention incorporate a method and a system of providing fault tolerance when implementing a data storage system using a data storage device. Aspects of the invention provide for redundancy coding of a portion of one or more sections or partitions of one or more data storage drives. The redundancy coding may be utilized when a fault occurrence corrupts data stored in the one or more data storage drives. The aforementioned aspects are substantially shown and described in connection with at least one of the following figures, as set forth more completely in the claims These and other advantages, aspects, and novel features of the present invention, as well as details of illustrated embodiments, thereof, will be more fully understood from the following description and drawings.

DETAILED DESCRIPTION OF THE INVENTION

Figure 1:
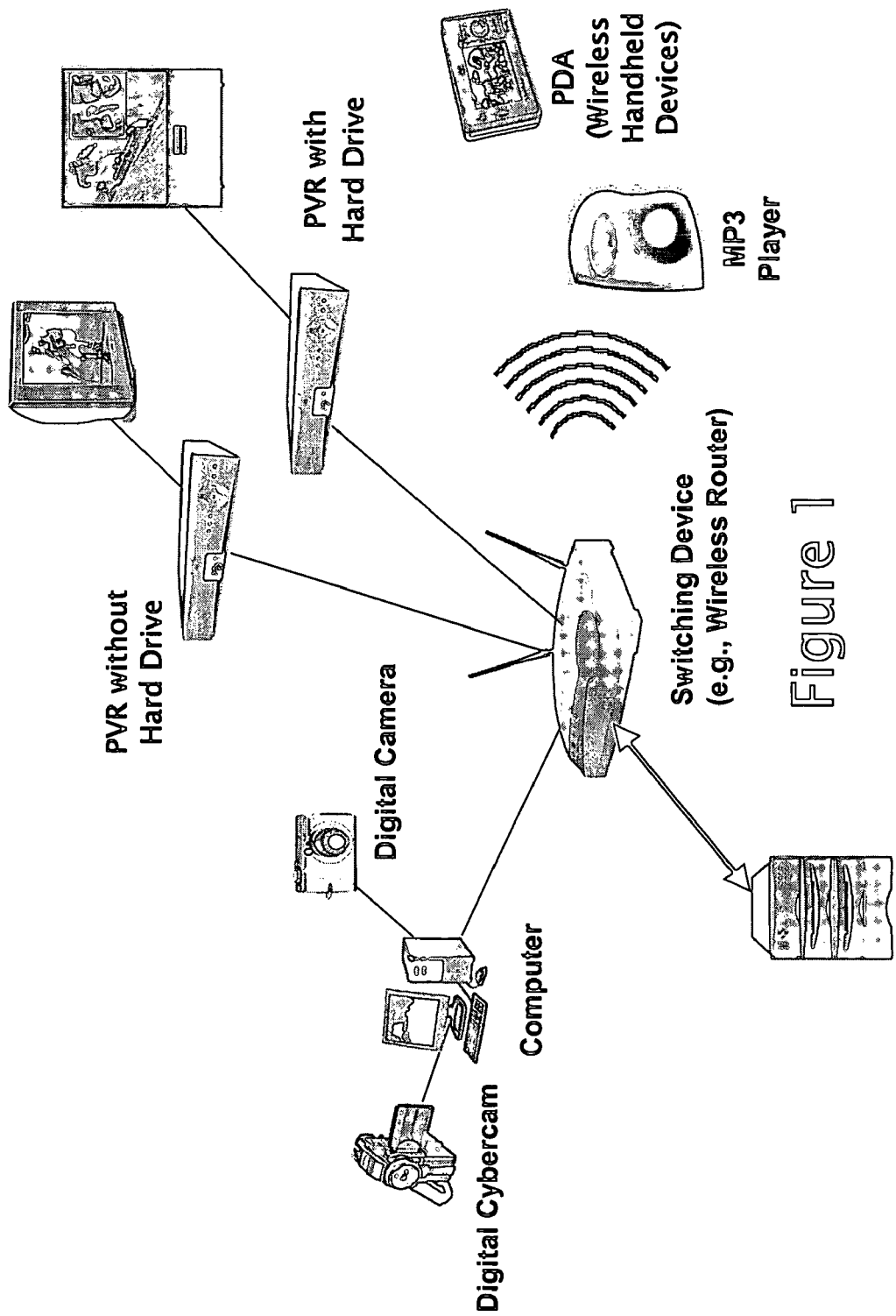
FIG. 1 illustrates a block diagram of a typical system incorporating the use of a network attached storage device (NAS) in accordance with an embodiment of the invention.

Aspects of the invention incorporate a method and a system of providing fault tolerance when implementing a data storage system using a data storage device. In one embodiment, the data storage device comprises one or more data storage drives. Additional data storage drives may be successively added to expand the capacity of the data storage device. The data storage drives may comprise hard disk drives.

Aspects of the invention provide for redundancy coding of a portion of one or more sections or partitions of one or more hard disk drives such that the partitions may be collectively used to generate one or more data pools. The coded portions comprise data that may reside in one or more headers of the one or more sections or partitions. The information stored within one or more data fields within the headers may be used to map and to access certain data from one or more partitions, such that one or more data pools required by a user is successfully accessed and retrieved. The headers may be termed pool information blocks (PIBs), and are located within each partition. The redundancy coding may comprise data stored in one or more fields of one or more partitions in the one or more data storage drives. The one or more fields may comprise a pane partition specifications field in a PIB, for example. A data pool, of course, corresponds to a pooling of one or more partitions over one or more hard disk drives, so as to generate a "logical drive". In a representative embodiment, the header (or PIB) is replicated such that a second header is generated. As such, two PIBs are incorporated into each partition, as a redundancy measure, yielding dual or mirrored PIBs. The data storage drives may be used to store video or multimedia data provided by a cable operator or telecommunications provider. The data storage device may be communicatively coupled to one or more data processing devices (such as personal video recorders (PVRs), PVR ready set-top-boxes, computers, PDAs, digital appliances, and the like), such that the data stored in the data storage device may be transmitted to or received from the one or more data processing devices. For example, the storage device may be connected or attached to a network such that the one or more data processing devices may write to or read from the data storage device. Because of its functionality, the aforementioned data storage device may be referred to as a network attached storage device (NAS). Detailed information concerning the use of pool information blocks (PIBs) may be found in U.S. patent application Ser. No. 11/087,136, entitled "METHOD AND SYSTEM OF DATA STORAGE CAPACITY ALLOCATION AND MANAGEMENT USING ONE OR MORE DATA STORAGE DRIVES" filed Mar. 22, 2005, the complete subject matter of which is incorporated herein by reference in its entirety.

As described herein, a data storage device may comprise one or more data storage drives, such as hard disk drives, or any other type of drive. The data storage device may comprise a combination of different types of data storage drives. A data storage drive may comprise any type of media capable of storing data. Hereinafter, the term "hard disk drive" alternatively may refer to a data storage drive or any drive or component comprising a media used to store data. In a representative embodiment, one or more data storage drives or hard disk drives may be incorporated into a data storage device. The data storage device comprises the one or more data storage drives or hard disk drives. In a representative embodiment, the data storage device facilitates the incorporation of the one or more additional data storage drives or hard disk drives. The data storage drives or hard disk drives may be expanded by way of connectors linking one data storage drive to another data storage drive.

FIG. 1 illustrates a block diagram of a typical system incorporating the use of a NAS 100 in accordance with an embodiment of the invention. The NAS 100 provides data storage for one or more data processing devices. As illustrated, an exemplary switching device provides connectivity of the NAS 100 to the one or more data processing devices. The switching device is capable of providing connectivity using wireless or wireline communications. For example, a wireless router may utilize any one of the following wireless or wireline data communications protocols: 10/100 Ethernet, gigabit Ethernet, 802.11x, Bluetooth, and the like. The one or more data processing devices comprise devices such as a digital cybercam, digital camera, MP3 player, PDA, and one or more personal video recorders (PVRs). As illustrated, a PVR may be equipped with or without a hard disk drive. In one embodiment, a PVR may be referred to as a set-top-box (STB) that incorporates personal video recorder capabilities. In one embodiment, a PVR may be referred to as a PVR-STB. The PVRs illustrated, are connected to a television or a monitor capable of playing multimedia content to a home user. Use of the NAS 100 provides a centralized storage device for multimedia content received by the one or more PVRs. As a consequence of storing content in a NAS 100, PVRs lacking a storage facility, such as a hard disk drive, may store any data it receives into the NAS 100. Further, any data stored by other data processing devices, including PVRs, may be easily accessed and viewed by any of the one or more data processing devices. For example, a PVR without hard drive may access multimedia content originally stored into the NAS 100 by a PVR with hard drive, and vice-versa. As a result, the NAS 100 facilitates sharing of data among the one or more data processing devices. Since it provides a remote storage mechanism, the NAS 100 may be considered a "virtual storage device" by the one or more data processing devices. The NAS 100 is configured such that its storage capacity may be easily expanded. In one embodiment, the NAS 100 may accept additional hard disk drives. The storage capacity of the NAS is easily expanded by inserting a hard disk drive into a "drive sled" which is easily inserted into the chassis of the NAS 100. The "drive sled" may be considered a device that interfaces or mates with one or more types of hard disk drives, such that insertion into the NAS 100 is performed effortlessly. In one embodiment, an existing hard disk drive may be replaced with one having a higher capacity. A NAS 100 may comprise additional multiple empty "drive sleds" capable of holding a number of drives, suitable for future growth and expansion.

When the NAS is first connected to the exemplary switching device shown in FIG. 1, one or more of its parameters may be setup as part of an initialization process. In one embodiment, the parameters setup during the initialization process comprises the NAS' time, date, and time zone. The NAS, for example, may utilize the computer illustrated in FIG. 1 as a reference source in setting up its time, date, and time zone. It is contemplated that the NAS may utilize any one of the other data processing devices (e.g., digital cybercam, digital camera, PVR without hard drive, PVR with hard drive, MP3 player, or PDA) shown in FIG. 1 as a reference source in the setup process.

Figure 2:
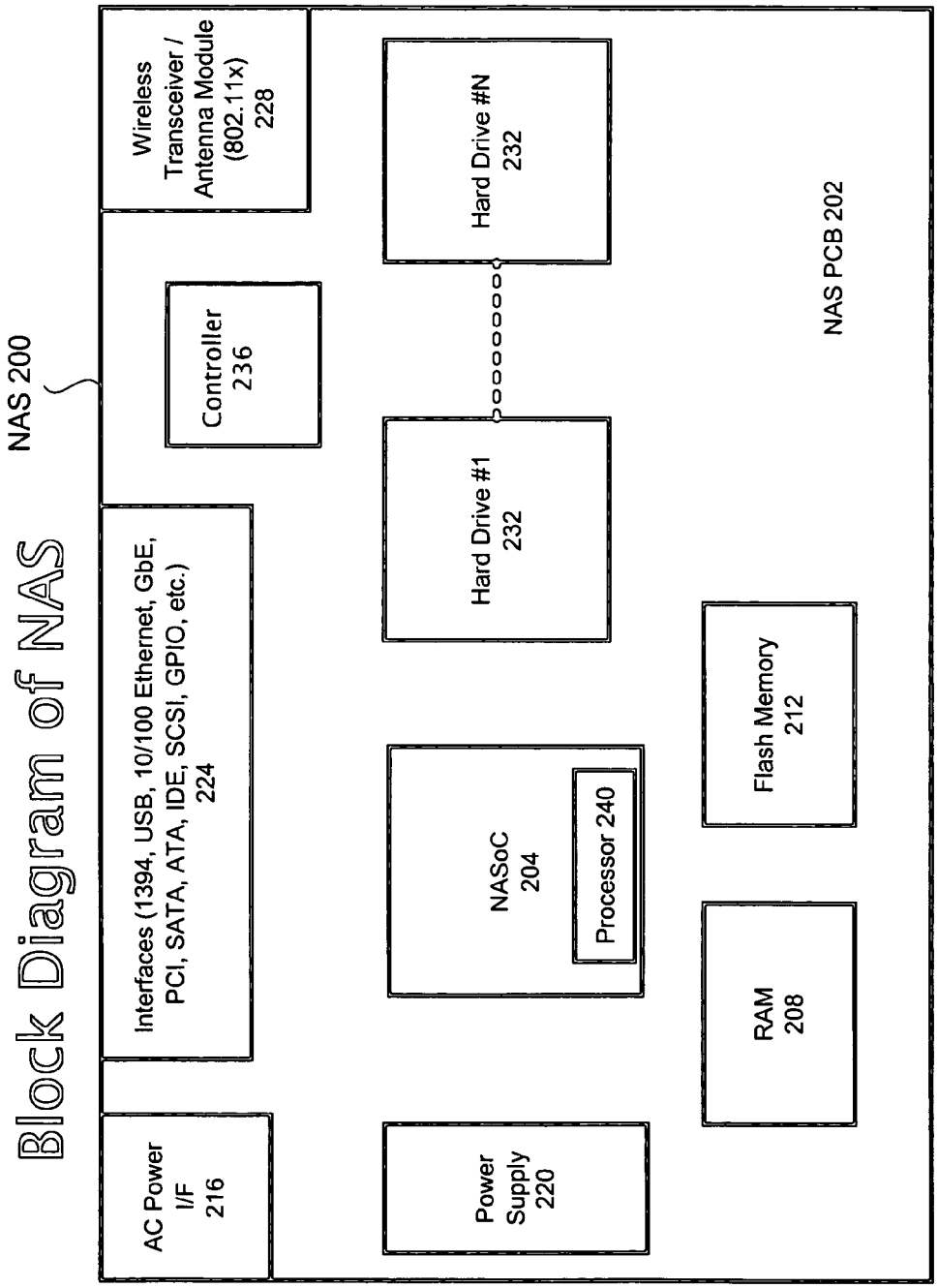
FIG. 2 is a block diagram of a NAS in accordance with an embodiment of the invention.

FIG. 2 is a block diagram of a network attached storage device (NAS) 200 in accordance with an embodiment of the invention. The NAS 200 comprises a printed circuit board (NAS PCB) 202 containing one or more components. The one or more components are electrically connected by way of the printed circuit board (PCB) 202. The one or more components comprises a NAS chip (NASoC) 204, a random access memory 208, a flash memory 212, an AC power interface 216, a power supply 220, a block of interfaces 224, a wireless transceiver/antenna module 228, one or more hard disk drives 232, and a controller 236. The interface block 224 may comprise one or more of the following interfaces: IEEE 1394, USB, 10/100 Ethernet, gigabit Ethernet, PCI, SATA, ATA, IDE, SCSI, GPIO, etc. The wireless transceiver/antenna module 228 may comprise a attachable module or mini-PCI card that may be optionally connected or attached to the NAS' printed circuit board 202. As illustrated, the NAS 200 may utilize up to N hard disk drives. The NAS 200 may be configured to comprise any number of hard drives, based on its intended use. The number of hard disk drives utilized, for example, may depend on the number of users accessing the NAS 200 or the types of applications used. The number of hard drives utilized, for example, may also be dependent on the extent of data mirroring or data striping (i.e., RAID) desired. Aspects of the present invention allow for storage capacity expansion since the NAS is designed to accommodate additional drives. One or more additional drives are incorporated by easily connecting one or more types of drives (of different sizes and speeds) into a hard drive carrier or "drive sled" that easily slides into the NAS chassis. In one embodiment, the controller 236 provides control for any one of several devices (such as hard disk drives) connected to the NASoC 204. The NASoC 204 may comprise an integrated circuit chip incorporating a processor or central processing unit (CPU) 240.

Figure 3:
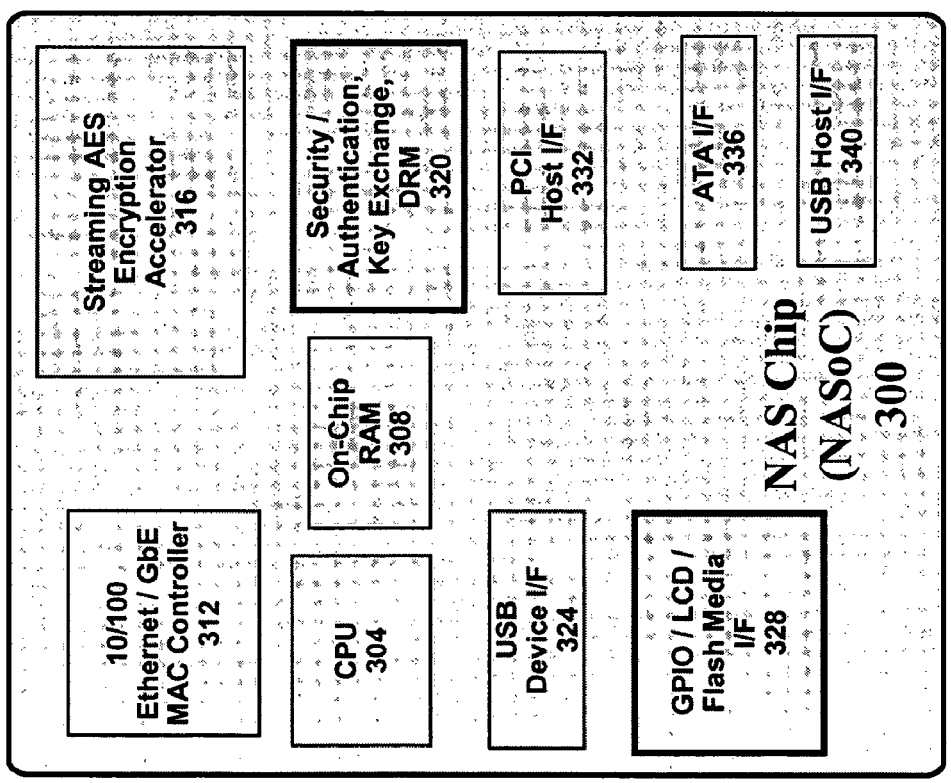
FIG. 3 is a block diagram of a NAS chip (NASoC) in accordance with an embodiment of the invention.

FIG. 3 is a block diagram of a NAS chip (NASoC) 300 in accordance with an embodiment of the invention. The NASoC 300 is an integrated circuit mounted on the previously described NAS PCB. The NASoC 300 provides one or more functions that allow the NAS to properly operate. The NASoC 300 comprises a central processing unit (CPU) 304, an on-chip random access memory 308, a Ethernet/MAC controller 312, an encryption accelerator 316, a security/authentication, key exchange, DRM chip 320, and a number of interfaces 324, 328, 332, 336, 340. For example, the following interfaces may be used: USB device I/F 324, a PCI host I/F 332, a GPIO/LCD/flash media I/F 328, an ATA I/F 336, and a USB host I/F 340. The NAS chip 300 may communicate and/or connect to the one or more components described in reference to FIG. 5.

Referring to FIG. 2, the NAS 200 may incorporate varying numbers of hard disk drives depending on its storage and RAID (mirroring and/or striping) requirements. For example, the NAS 200 may utilize 4 hard disk drives for implementing RAID 0+1 (both data mirroring and data striping), suitable for use in a small office/business environment. On the other hand, the NAS 200 may utilize only 1 or 2 hard disk drives in a home (or household) environment since the storage capacity utilized is typically less than that utilized in an office or business environment. In other representative embodiments, the NAS 200 may utilize any number (i.e., one or more) hard disk drives. Similarly, memory components utilized in the NAS 200 may be varied depending on type of use. As the data storage requirements increase and as the frequency of data storage related requests increase, the performance of the NAS 200 may be improved to meet its operational needs, by way of increasing memory size of the NAS 200. For example, flash or DRAM memory capacities may be increased in order to improve the processing performance of the NAS 200. Similarly, the chassis size, power circuitry, and other components may be adjusted to meet the processing requirements when storage capacity of the NAS is expanded.

In one embodiment, the processor 240 within the NASoC (204 or 300) executes software or firmware residing within the RAM 208 and/or flash memory 212 when the NAS 200 is booted up or powered up. In one embodiment, execution of the software generates one or more fault tolerant algorithms that are used when one or more faults occur during data manipulation by the NAS 200. In one embodiment, the software or firmware is stored in the RAM 208 or flash memory 212 of the NAS 200, as previously referenced in FIG. 2. The flash memory may comprise a non-volatile random access memory (NVRAM).

Figure 4:
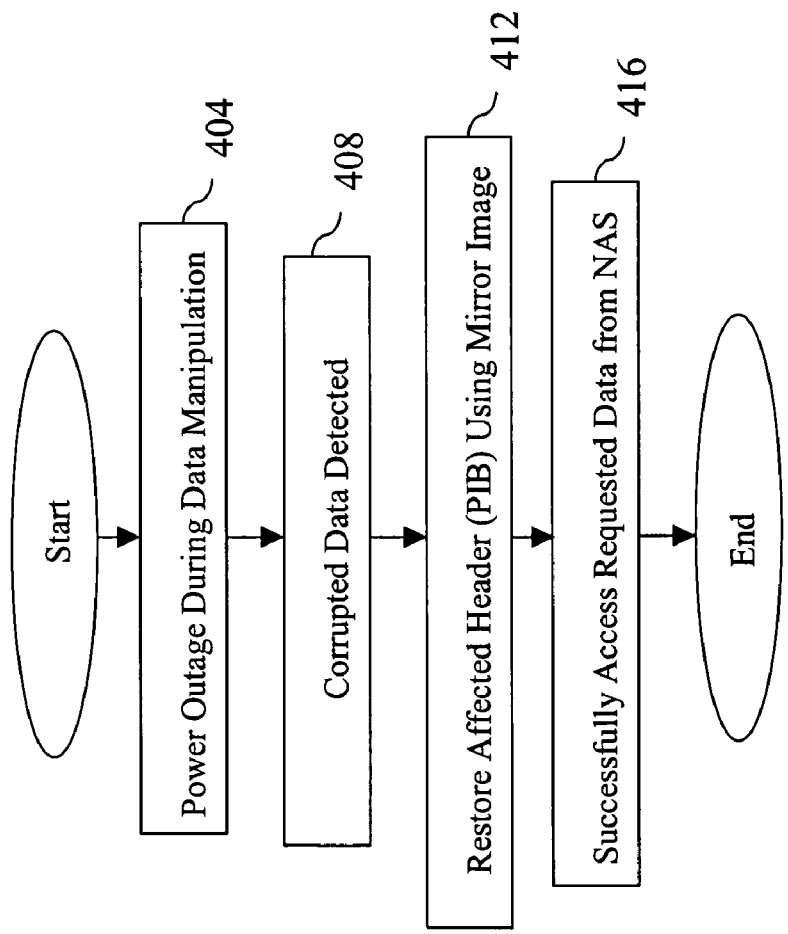
FIG. 4 is an operational flow diagram illustrating the process of successfully accessing data from a NAS when a fault occurs, in accordance with an embodiment of the invention.

FIG. 4 is an operational flow diagram illustrating the process of detecting and correcting corrupt data within one or more data storage drives of a NAS, in accordance with an embodiment of the invention. A fault occurrence may result in corruption of data stored in one or more partitions of the one or more data storage drives. The corrupted data may comprise one or more pool information blocks (PIBs) used in the linking or concatenating of one or more partitions used to create or form a data pool. The fault occurrence may comprise a power outage during data processing or data manipulation of the PIBs, for example. For example, a power outage or power supply interruption during an operation on a PIB may cause corruption of data. The operation may comprise updating data stored in a PIB, for example. In addition, an interruption of an electrical signal provided to one or more data storage drives in the NAS may constitute a fault occurrence. This may occur when a user removes or abruptly disconnects a data storage drive. A fault occurrence may comprise any physical or electrical stimulus that causes corruption of data in the one or more data storage drives of the NAS. At step 404, an exemplary power outage occurs while data is being manipulated by the NAS. The power outage may occur while a pool information block (PIB) is being modified or updated, for example. The power outage may result in corrupt data found in one or more partitions of one or more hard disk drives. The one or more partitions may comprise the PIB being modified. Each of the one or more partitions may comprise mirrored (or dual) pool information blocks (PIBs). As a consequence, only one of the two PIBs (e.g., the active or first PIB) may be affected from the fault occurrence or exemplary power outage. At step 408, the NAS detects corrupt data when reading one or more data pools, for example. The NAS may detect corrupt data when a data pool is read after one or more partitions are concatenated. At step 412, one or more algorithms are used to restore the corrupt data in the corrupt PIB (e.g., active PIB or first PIB or first header) by using its mirror PIB (e.g., inactive PIB or second PIB or second header). In a representative embodiment, the associated data pool may be un-mounted when restoring the corrupt data in the affected PIB. As referenced in incorporated U.S. patent application Ser. No. 11/087,136, entitled "METHOD AND SYSTEM OF DATA STORAGE CAPACITY ALLOCATION AND MANAGEMENT USING ONE OR MORE DATA STORAGE DRIVES" filed Mar. 22, 2005, the first and second headers (the mirrored PIBs) may contain information pertaining to the various partitions that collectively form a data pool. Each of the first and second headers may contain information related to organizational structure and/or identification of its partition in its associated data pool. This detection and correction process may occur by reading, verifying, and testing one or more associated data pools, for example. After the data in the first PIB has been restored, the process continues with step 416, at which, the corrected data is successfully accessed or read, and its associated partitions are correctly linked to form the expected data pool. The data pool may be tested using one or more applications as a final verification step. Thereafter, the associated data pool may be re-mounted. The data from the data pool may be requested and retrieved by one or more data processing or computing devices communicatively coupled to the NAS. One or more applications may now utilize the data stored in the data pool.

In a representative embodiment, the NAS may detect corrupt data by examining one or more corresponding fields of each of the two PIBs. For example, the NAS may detect a mismatch of data between two corresponding fields. In a representative embodiment, one or more algorithms are applied to the dual PIBs of each of the one or more partitions in order to detect and correct any corrupt data found in each of the PIBs in the one or more partitions of the data pool. For example, the one or more algorithms may detect and correct any mismatch between corresponding fields of the dual PIBs. Once a discrepancy is detected, the one or more algorithms may effectuate the further examination of other fields in the PIBs. The algorithms may comprise comparing the data stored between corresponding PIBs of each of the one or more partitions of a data pool. In a representative embodiment, the NAS may use the PIB's time and date field to determine which of the two PIBs was created earlier. In a representative embodiment, the PIB that was created earlier may be used as a reference to re-write data onto the corrupt field of the other PIB.

Figure 5:
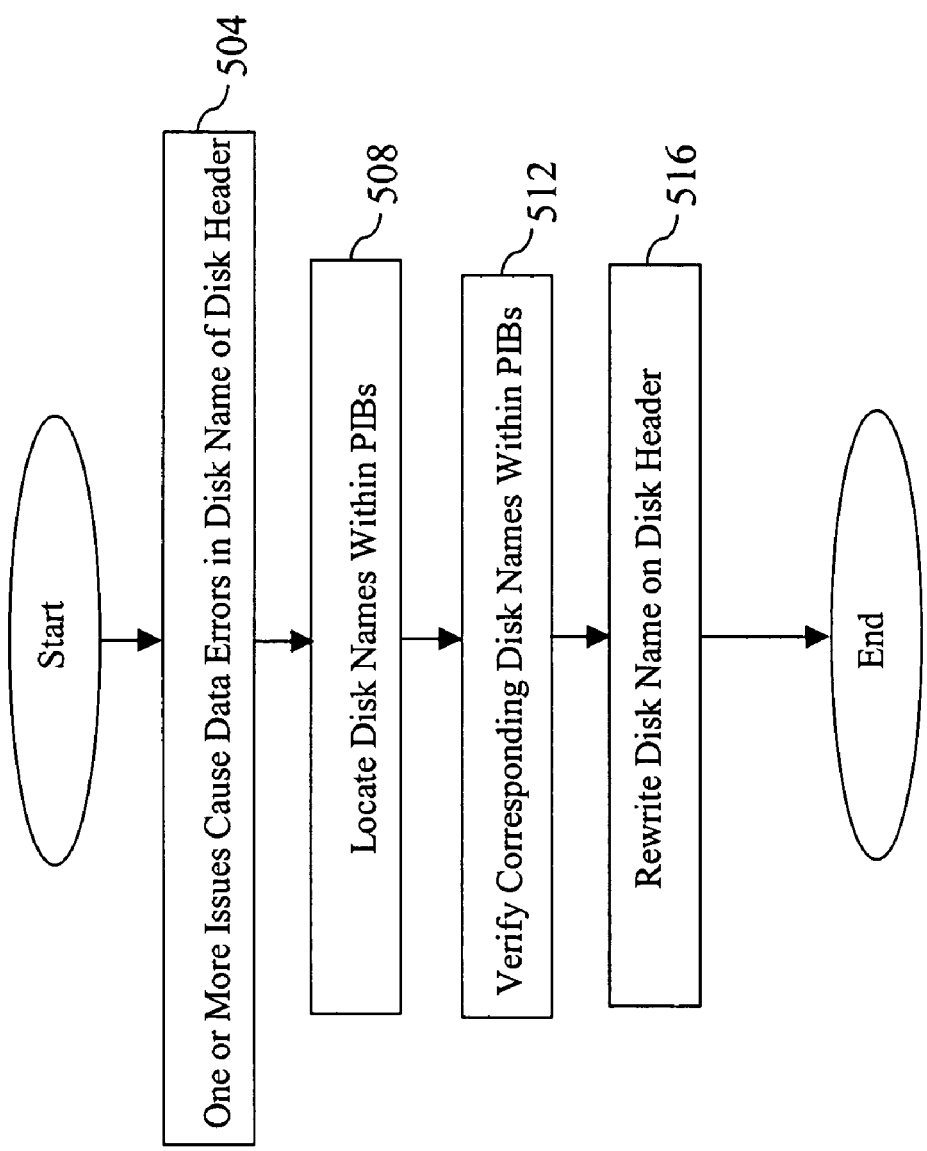
FIG. 5 is an operational flow diagram implementing a fault tolerant procedure when one or more issues corrupt a disk name field in a disk header during a disk renaming operation, in accordance with an embodiment of the invention.

FIG. 5 is an operational flow diagram implementing a fault tolerant procedure when one or more issues corrupt a disk name field in a disk header during a disk renaming operation, in accordance with an embodiment of the invention. The one or more issues may comprise data errors resulting from a power failure of the NAS or a hard disk drive being removed from the NAS at the time a renaming operation is performed. At step 504, one or more issues occur to cause errors in writing a disk name onto a disk name field of a disk header of a hard disk drive. For example, a power failure during a disk renaming operation may cause the NAS to reboot itself. During the reboot cycle, the NAS may automatically execute instructions during the boot-up sequence to verify or check one or more fields associated with the disk renaming operation. The one or more fields may comprise the pane partition specification fields located within one or more pool information blocks (PIBs). (Please refer to incorporated U.S. patent application Ser. No. 11/087,136, entitled "METHOD AND SYSTEM OF DATA STORAGE CAPACITY ALLOCATION AND MANAGEMENT USING ONE OR MORE DATA STORAGE DRIVES" filed Mar. 22, 2005. At step 508, the NAS locates the pane partition specification field in a PIB of a partition within the hard disk drive. The pane partition specification may comprise the disk name in which the partition resides. At step 512, the NAS may verify that the disk names within the pane partition specification fields of both PIBs are equivalent. Also, the NAS may further verify that the Disk Unique ID, the NAS ID and the time/date stamp, in order to ensure the integrity of the data provided by the PIBs. Next, at step 516, the NAS re-writes the disk name (using the disk name obtained from a PIB), into the Disk Name field in the Disk Header of the hard disk drive, if the disk names within the pane partition specification fields are equivalent.

Detailed information concerning the structure of a disk header may be found in U.S. patent application Ser. No. 11/087,136, entitled "METHOD AND SYSTEM OF DATA STORAGE CAPACITY ALLOCATION AND MANAGEMENT USING ONE OR MORE DATA STORAGE DRIVES" filed Mar. 22, 2005, the complete subject matter of which is incorporated herein by reference in its entirety. The disk header, in this representative embodiment, comprises 2,560 bytes each. The disk header comprises a number of fields. The offsets and byte length of the fields within the disk header may vary. It is contemplated that other embodiments may be utilized in accordance with various aspects of the present invention.

Various aspects of the invention provide that the disk header utilize two identical partition tables. The use of two identical partition tables provides a measure of redundancy. The first partition table or the second partition tables may comprise 1024 bytes. The disk header is structured such that at any given time, only one of the two partition tables is active, as indicated by a one byte flag field provided within the disk header. When a change or modification is to be made to a partition table, the new information is written into the inactive partition table, hereby identified as a first partition table, and the one byte flag is toggled so as to make the inactive partition table (first partition table) active. The first partition table is now capable of being accessed or used by one or more applications while the second partition table may now copy the updated data from the first partition table. Redundant partition tables provide a safety measure when one or the two partition tables becomes corrupted due to a fault occurrence. The fault occurrence causes corruption of data and/or data errors to one or more partition tables of an affected data storage drive. The fault occurrence may comprise an interruption of power that occurs during data processing or data manipulation of one of the two identical partition tables, for example. The fault occurrence may comprise removal of a data storage drive when an update to the data storage drive's partition table is being performed. The partition tables, of course provide the location and sizes of the one or more partitions in the data storage drive. Detailed information concerning the disk header may be found in U.S. patent application Ser. No. 11/087,136, entitled "METHOD AND SYSTEM OF DATA STORAGE CAPACITY ALLOCATION AND MANAGEMENT USING ONE OR MORE DATA STORAGE DRIVES" filed Mar. 22, 2005, the complete subject matter of which is incorporated herein by reference in its entirety.

Various aspects of the present invention provide fault tolerance during a pool renaming operation. One or more methods and systems of fault tolerance during pool renaming is implemented. In a representative embodiment, the method utilized prevents writing of a data pool name onto a second PIB until the first PIB is completely written. The method utilized may prevent renaming of a data pool when at least one data storage drive is missing. Before the pool is renamed, the missing data storage drive must be reinstalled into the data storage device.

In addition, one or more new variables may be created in memory, such as non-volatile random access memory (NVRAM), such that the new data pool name may be stored into one of the one or more new variables while the old name is being used by way of an existing variable. The data pool name, in this instance, may be required for normal operation by a printer server and/or primary domain controller (PDC). When the existing variable is not being used by the functions and operations required by the printer server and/or PDC, the existing variable may be updated using the stored data in the new variable. Thereafter, the new variable may be deleted.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of providing fault tolerant renaming of a hard disk drive in a data storage device, said data storage device comprising one or more hard disk drives, said method comprising:

executing a set of software instructions resident in a memory of said data storage device when a disk name field of a disk header of one of said one or more hard disk drives contains an error, said error occurring during said renaming;

first locating a first field within a first pool information block of a partition of said hard disk drive;

second locating a second field within a second pool information block of said partition of said hard disk drive;

first identifying a first disk name within said first field;

second identifying a second disk name within said second field;

comparing said first disk name with said second disk name; and writing said first disk name into said disk name field of said disk header of said hard disk drive if said first disk name is the same as said second disk name.

2. The method of claim 1 wherein said first field and said second field comprise pane partition specification fields.

3. A method of providing fault tolerant renaming of a data pool of a data storage device, said data storage device comprising one or more hard disk drives, said method comprising:

creating a first variable in memory used to store a new name of said data pool, said first variable used by one or more data processing devices, said first variable complementary to a second variable, said second variable storing an old name of said data pool; and updating said second variable using said new name of said data pool stored in said first variable.

4. The method of claim 3 wherein said one or more data processing devices comprises a printer server.

5. The method of claim 3 wherein said one or more data processing devices comprises a primary domain controller.

6. A system for providing a fault tolerant implementation of one or more data pools using one or more data storage drives, said system comprising:

a memory;

a software resident in said memory; and a processor capable of executing said software, said executing capable of generating a first partition table and a second partition table, said first partition table being a mirror image of said second partition table, said first or said second partition table providing the location and size of one or more partitions in said one or more data storage drives; said executing capable of generating a first pool information block and a second pool information block in each of said one or more partitions, said first pool information block being a mirror image of said second pool information block, said first or said second pool information blocks providing information related to concatenating said one or more partitions, wherein said concatenating generates said one or more data pools using said one or more data storage drives.

7. The system of claim 6 wherein said data storage drives comprises hard disk drives.

8. A method of providing fault tolerant renaming of a data pool of a data storage device, said data storage device comprising one or more hard disk drives, said method comprising:
creating a first variable in memory used to store a new name of said data pool, said first variable used by one or more data processing devices, said first variable complementary to a second variable, said second variable storing an old name of said data pool; and
updating said second variable using said new name of said data pool stored in said first variable, wherein said one or more data processing devices comprises a printer server.

9. A method of providing fault tolerant renaming of a data pool of a data storage device, said data storage device comprising one or more hard disk drives, said method comprising:
creating a first variable in memory used to store a new name of said data pool, said first variable used by one or more data processing devices, said first variable complementary to a second variable, said second variable storing an old name of said data pool; and
updating said second variable using said new name of said data pool stored in said first variable, wherein said one or more data processing devices comprises a primary domain controller.

10. A system for providing fault tolerant renaming of a hard disk drive in a data storage device, said data storage device comprising one or more hard disk drives, said system comprising:
one or more circuits operable for, at least:
executing a set of software instructions resident in a memory of said data storage device when a disk name field of a disk header of one of said one or more hard disk drives contains an error, said error occurring during said renaming;
first locating a first field within a first pool information block of a partition of said hard disk drive;
second locating a second field within a second pool information block of said partition of said hard disk drive;
first identifying a first disk name within said first field;
second identifying a second disk name within said second field;
comparing said first disk name with said second disk name; and
writing said first disk name into said disk name field of said disk header of said hard disk drive if said first disk name is the same as said second disk name.

11. The system of claim 10 wherein said first field and said second field comprise pane partition specification fields.

12. A system for providing fault tolerant renaming of a data pool of a data storage device, said data storage device comprising one or more hard disk drives, said system comprising:
one or more circuits operable for, at least:
creating a first variable in memory used to store a new name of said data pool, said first variable used by one or more data processing devices, said first variable complementary to a second variable, said second variable storing an old name of said data pool; and
updating said second variable using said new name of said data pool stored in said first variable.

13. The system of claim 12 wherein said one or more data processing devices comprises a printer server.

14. The system of claim 12 wherein said one or more data processing devices comprises a primary domain controller.

15. A method of providing a fault tolerant implementation of one or more data pools using one or more data storage drives, said method comprising:
executing a software, said executing capable of generating a first partition table and a second partition table, said first partition table being a mirror image of said second partition table, said first or said second partition table providing the location and size of one or more partitions in said one or more data storage drives; said executing capable of generating a first pool information block and a second pool information block in each of said one or more partitions, said first pool information block being a mirror image of said second pool information block, said first or said second pool information blocks providing information related to concatenating said one or more partitions, wherein said concatenating generates said one or more data pools using said one or more data storage drives.

16. The method of claim 15 wherein said data storage drives comprises hard disk drives.

\* \* \* \* \*